Aug. 14, 1945.　　　　　S. R. ETNYRE　　　　　2,382,042
POSITIVE DISPLACEMENT GEAR PUMP
Filed Feb. 24, 1943　　　　2 Sheets-Sheet 1

Inventor
Samuel R. Etnyre
BY
Parker, Carlson, Pitzner & Hubbard.
Attorneys.

Aug. 14, 1945.  S. R. ETNYRE  2,382,042
POSITIVE DISPLACEMENT GEAR PUMP
Filed Feb. 24, 1943  2 Sheets-Sheet 2

Inventor
Samuel R. Etnyre
BY
Parker, Carlson, Pigner & Hubbard
Attorneys.

Patented Aug. 14, 1945

2,382,042

UNITED STATES PATENT OFFICE 2,382,042

POSITIVE DISPLACEMENT GEAR PUMP

Samuel R. Etnyre, Oregon, Ill., assignor to E. D. Etnyre & Co., Oregon, Ill., a corporation of Illinois Application February 24, 1943, Serial No. 476,905

2 Claims. (Cl. 103—128)

The invention relates to gear pumps, and the general aim of the invention is to provide a new and improved device of this character which is capable of impelling fluid in a uniform, positive yet substantially impulse-free stream or flow whereby the pump is especially well adapted for use where uniformity of the material flow is requisite, as in the distribution of rather viscous, bituminous materials onto road surfaces.

Gear pumps, as is well known, place fluid under pressure by the forcible expulsion thereof from the interdental spaces or valleys between the gear teeth as the teeth successively mesh. Such impelling action produces a non-uniform, pulsating flow, transmits irregular torque forces to the driving connections and requires a relatively high power input.

An object of the invention is to provide a new and improved gear pump which includes a plurality of gear members or impellers having helical teeth arranged to substantially eliminate the transmission of power impulses resulting from the impelling action of the gear teeth to the pressure stream while maintaining a positive discharge of fluid.

Another object more specifically stated is to provide in such a device two separated pairs of coacting gear members, each of which pairs is separately in communication with the fluid inlet and outlet to the pump, said members each having helically arranged teeth, and the operative relation of the pairs being such that the teeth of each pair is disposed in staggered, out of alined relation to the teeth of the other pair with the helical angle of the teeth of one pair opposite to that of the teeth of the other pair.

Other objects and advantages will become apparent in the following description and from the accompanying drawings in which.

Figure 1:
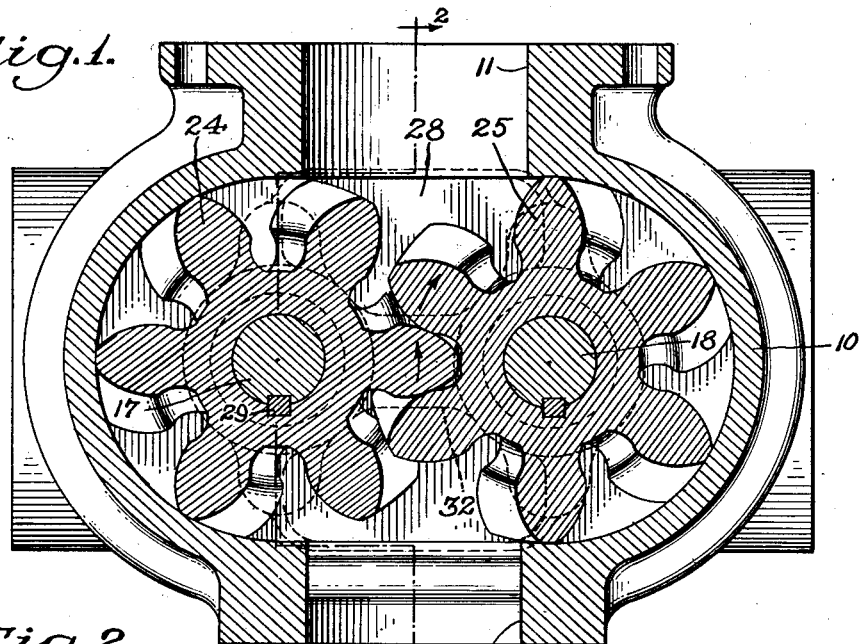
Figure 1 is a cross sectional view through a gear pump embodying the features of the invention taken on a plane substantially normal to the axes of the impeller gears as indicated by the line 1—1 of Fig. 3.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawings, the numeral 10 designates a somewhat oval hollow casing having open end faces. Between the end faces on opposite sides of the casing are flanged ports or passages 11, 12 of which the one designated 11 in this instance is the inlet and the one designated 12 is the outlet. The open end faces are adapted to be closed by end plates 13, 14 each provided with spaced bosses 15, 16 so arranged that when the end plates are mounted on the casing the corresponding bosses 15, 15 and 16, 16 will be axially alined (see Fig. 3).

Figure 2:
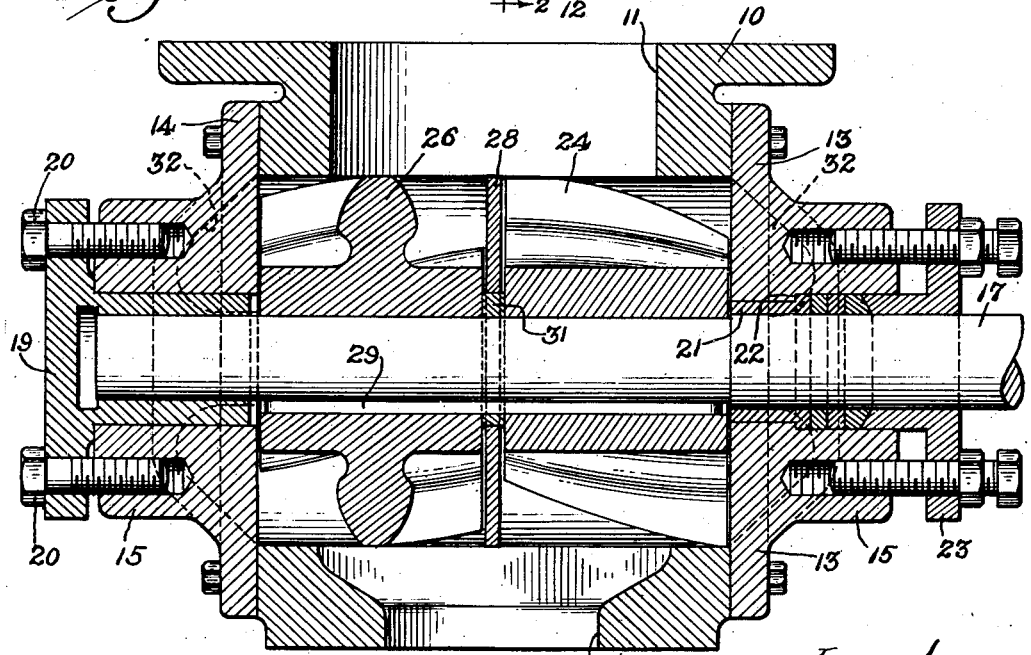
Fig. 2 is a cross sectional view taken substantially along the line 2—2 of Fig. 1.

One pair of alined bosses (in this instance the pair 15) supports a drive shaft 17 and the other pair of bosses 16 a stub or rotatable shaft 18. To this end one boss 15 and both bosses 16 are provided with cap bearings 19 suitably secured to the end walls 13, 14 in fluidtight relation as by screws 20 (Fig. 2). The remaining boss 15 is arranged to permit the end of the drive shaft to extend through the end plate and accordingly has therein a sleeve bearing 21 seated against an internal shoulder 22 in the boss. A suitable packing gland 23 located outwardly of the bearing prevents leakage.

Within the housing are two pairs of impellers or gears 24, 25 and 26, 27 mounted respectively on the shafts 17, 18. As shown the corresponding gears 24, 26 are mounted on the drive shaft 17 and the other corresponding gears 25, 27 on the stub shaft 18. The relationship of the gears, the shafts and the interior of the casing disposes the line of tooth engagement generally on the axes of the ports 11, 12 with the gears in running engagement with the casing walls between these ports. The pairs of gears 24, 25 and 26, 27 are respectively disposed adjacent to the end plates 13 and 14, the opposite side faces thereof being preferably close together but separated by a partition or separating plate 28 which divides the casing substantially on the axes of the ports 11, 12.

Figure 3:
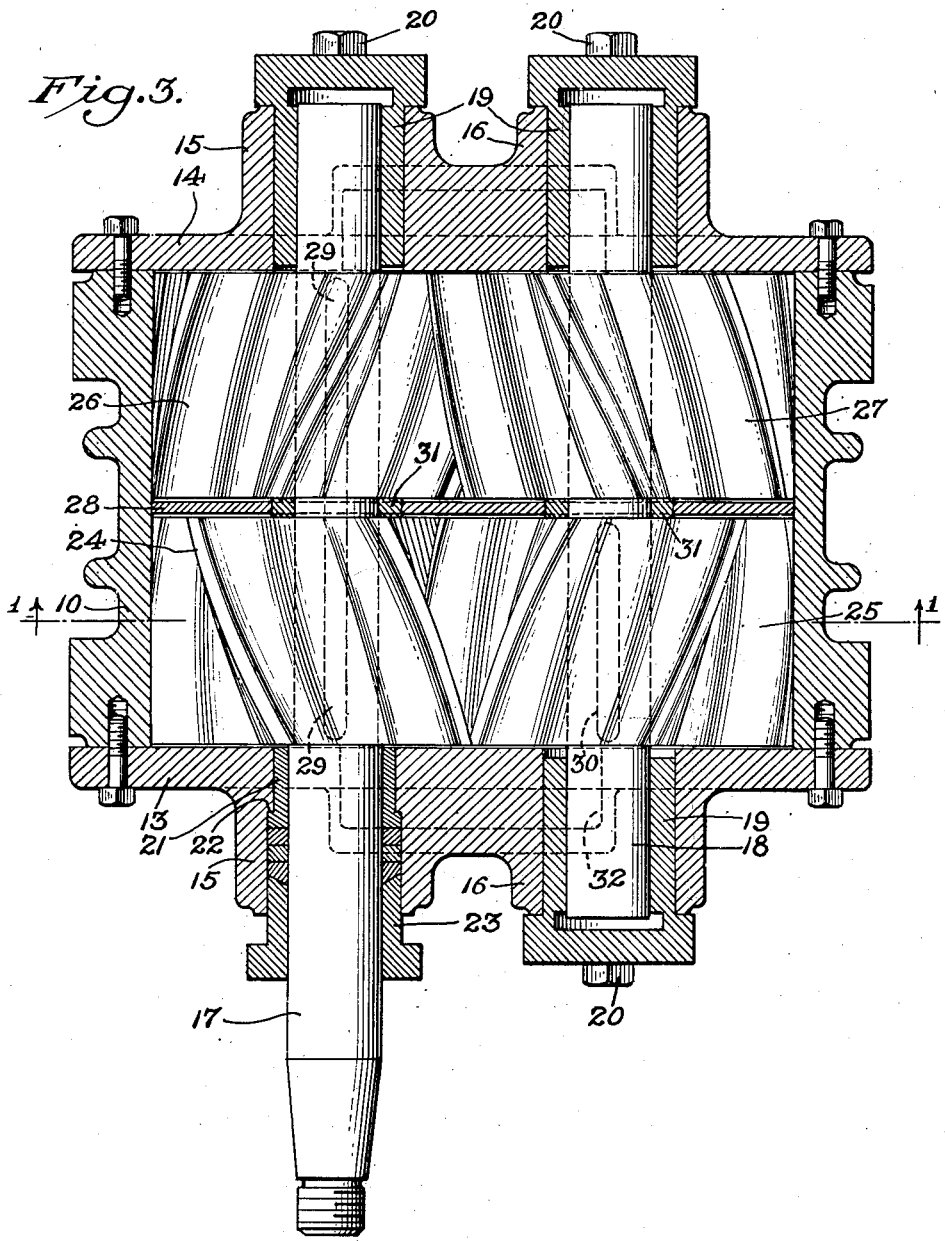
Fig. 3 is a view looking downwardly on the device as shown in Fig. 1, parts of the housing being in section.

The teeth on the four impeller gears are, as shown best in Fig. 3, formed on helical angles with the teeth on the respective pairs of gears 24, 25 and 26, 27 extending oppositely, preferably at equal helical angles. To insure substantially positive displacement with teeth of such character, the gears are made relatively narrow and the helix angle of the teeth is related to the width of the gears so that the teeth do not overlap an appreciable amount, that is, the leading end of one tooth and the trailing end of the adjacent tooth terminate approximately in a common plane through the axis of the gear. With this construction, leakage from the pressure to the suction side of the pump through the interdental spaces is minimized. It will be noted moreover that the teeth on one pair of gears are located opposite to the valleys between the teeth on the other pair of gears. In other words, the teeth on the pairs of gears have a staggered relation.

The gears 24, 26 on the driving shaft 17 are fixed thereto as by key 29 while one of the gears on the rotatable stub shaft 18 (in this instance the gear 25) is likewise secured or keyed, as at 30, thereto. Thus the gears 24, 25 and 26 are driven and the staggered relation between the teeth of the gears is maintained. The fourth or remaining gear 27 is preferably not keyed to the stub shaft but runs free thereon to insure that it will have positive tooth contact at all times with its associated gear 25. By this arrangement the gears 25 and 27 are driven independently of each other by gears 24 and 26 respectively to produce most efficient operation of each pair of gears while positively maintaining the staggered relationship of the teeth of one pair of gears to those of the other pair.

In the operation of the pump it will be evident that as the shaft 17 is driven to rotate the gears in one direction (i. e. in the direction indicated by the arrows in Fig. 1 and upwardly at the point of tooth engagement as shown in Fig. 3) fluid in the valleys or interdental spaces between the helical teeth will be subjected to a progressive impelling action whereby the force imparted by any helical tooth will be smooth and even and will be transmitted over the circumferential extent of the tooth. As the teeth are formed without any substantial overlap, leakage between the pressure and suction sides of the pump is minimized thus insuring positive displacement of fluid. Furthermore the staggered arrangement of the teeth on the two pairs of gears also staggers the impulses resulting from the initial movement of the teeth into their corresponding valleys. Together these factors cooperate to produce a positive yet steady, impulse free flow of fluid under pressure since the staggered impulses will be absorbed or damped by the smooth even flow produced by the helical teeth.

The arrangement of the teeth on the gear pairs at opposite and equal helical angles produces a counterbalance of the thrust forces set up in either pair of gears and it is preferred to provide means for spacing the inner end face of each gear from the partition plate. In the present instance this means is in the form of a thrust washer or bearing 31 of slightly greater thickness than the partition plate encircling each shaft 17, 18 between the associated gears and seated in an appropriately sized hole in the partition plate. To receive the fluid forced outwardly toward the end plates by the helical teeth a fluid receiving recess 32 is provided in each end plate opposite the ends of the teeth on the pressure side of the pump.

The present invention thus provides an impulse free gear pump capable of delivering a positive yet steady, uniform fluid flow of a character particularly desirable for such uses as in distributor systems for applying bitumen or like materials to road surfaces.

I claim as my invention:

1. A positive displacement gear pump comprising, in combination, a pump housing, a partitioning member dividing said housing into two chambers, a pair of intermeshing helical toothed gears rotatably supported in each of said chambers, said gears being mounted with the teeth of one pair in staggered relation to the teeth of the other pair, means for rotatably driving said gears, the teeth of said gears being formed with a helix angle related to the width of the gears so that the leading end of each tooth terminates with the following end of the adjacent tooth approximately in a common plane passing through the axis of the gear whereby to provide a smooth yet substantially positive discharge of fluid, said gears being arranged with the teeth of one pair disposed at an angle opposite to the teeth of the other pair, a fluid inlet communicating with both of said chambers, and a fluid outlet communicating with both of said chambers to receive the combined discharge of both pairs of gears.

2. A positive displacement gear pump comprising, in combination, a pump housing, a partitioning member dividing said housing into two chambers, a pair of shafts journalled on said housing and extending through both of said chambers, a pair of helical toothed impeller gears disposed in each of said chambers with the teeth of one pair disposed at an angle opposite to the teeth of the other pair and having the teeth of said one pair staggered with respect to the teeth of the other pair, the corresponding gears of said pairs being mounted on respective ones of said shafts in end-to-end relation on opposite sides of said partitioning member, the teeth of said gears being formed with a helix angle related to the width of the gears so as to provide a smooth yet substantially positive discharge of fluid when the gears are rotated, means for driving said shafts in a direction in which the teeth of said gears tend to move the fluid away from said partitioning member, and spacing means interposed between the gears on each shaft for rigidly maintaining the gears in predetermined spaced relation to said partitioning member.

SAMUEL R. ETNYRE.